June 17, 1958     A. J. SARKA     2,838,947
VARIABLE SPEED TRANSMISSION
Filed June 25, 1956
Fig. 1.
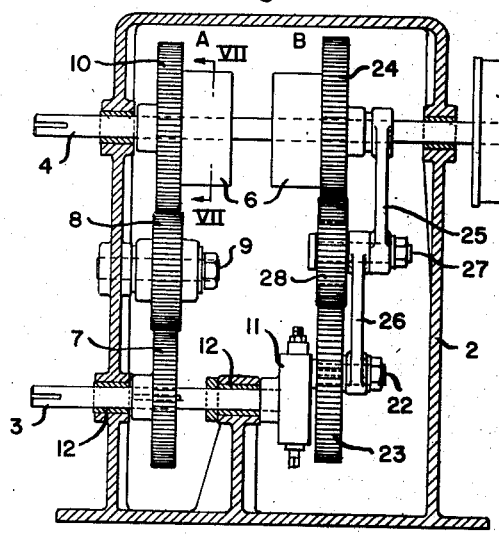
Fig. 2.
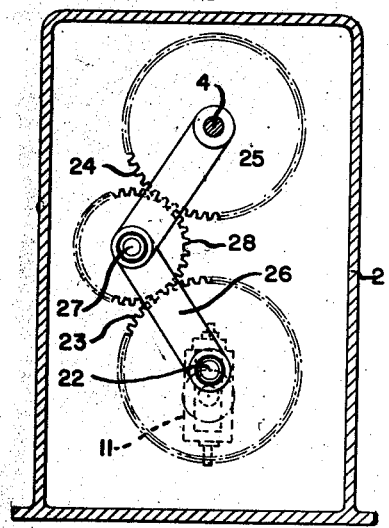
Fig. 3.
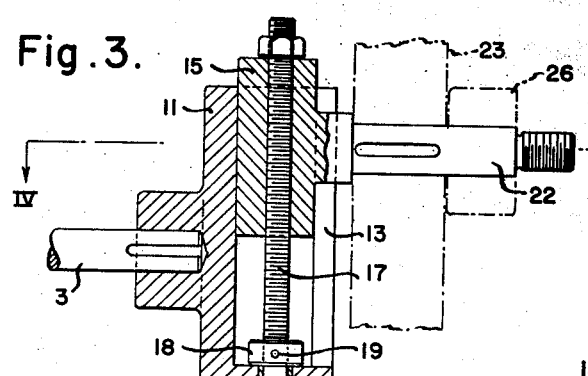
Fig. 6.
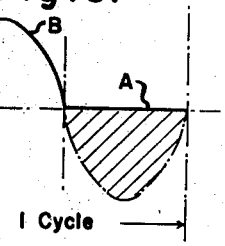
Fig. 4.
Fig. 5.
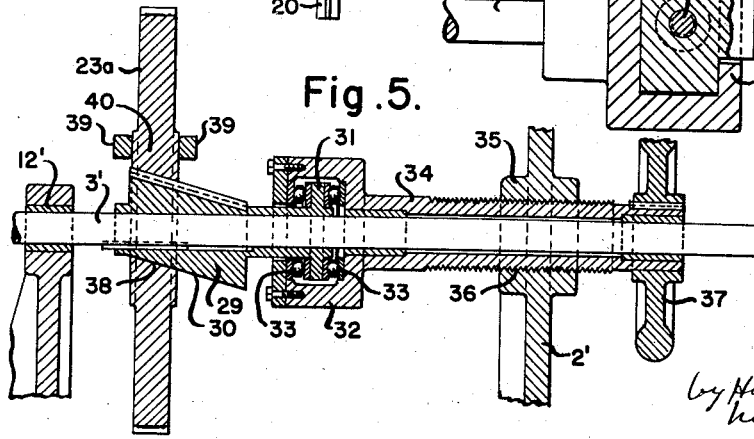
Fig. 7.
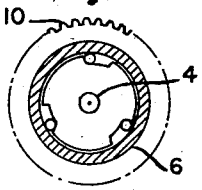
INVENTOR
Albert J. Sarka
by Hoopes Leonard & Buell
his attorneys

# United States Patent Office 2,838,947
Patented June 17, 1958

2,838,947

VARIABLE SPEED TRANSMISSION

Albert J. Sarka, Maple Heights, Ohio, assignor to Wean Equipment Corporation, Euclid, Ohio, a corporation of Ohio Application June 25, 1956, Serial No. 593,620

12 Claims. (Cl. 74—394)

This invention relates to a variable speed transmission. It relates particularly to a variable speed transmission of relatively simple and inexpensive construction for driving a driven shaft at constant speed during a portion of the operating cycle and at higher speed during another portion of the operating cycle.

In certain operations upon elongated material such as strip or wire the elongated material is advanced continuously and during its advance is periodically operated upon at an operation station, as, for example, by a flying shear, flying punch or the like. The modern tendency is toward higher and higher speeds. During the portion of the operating cycle during which work is being operated upon by, for example, a flying shear, it should be advancing at the speed of advance of the flying shear so that the work is properly sheared without buckling or other undersirable deformation such as may occur, particularly at high speed, when work is being sheared by a flying shear whose speed of advance at the time of shearing is not accurately synchronized to the speed of advance of the work.

It is most satisfactory to shear advancing work by means of a flying shear with the work and shear advancing at constant speed and in general flying shears are designed accordingly. Since the shearing action is accomplished in a very brief time interval it is not necessary that the shear advance at constant speed for more than a fraction of a second, but during the shearing action the speed of advance of the shear and the speed of advance of the work should be the same.

When relatively great lengths of material are being sheared or otherwise acted on on the fly the speed of the cycle is limited by the time required for the work to advance between operations. To increase the speed of the cycle the work should be speeded up in between shearing or other operations upon the work but should be slowed down to the predetermined constant speed of advance of the shears or other operating mechanism at the time of operating on the work.

I provide a variable speed transmission for advancing elongated work at constant speed during a portion of the cycle and at higher speed during another portion of the cycle whereby the cycle may be speeded up by moving the work faster in between shearing or other operations than at the time during which the operations are being performed upon the work. My variable speed transmission maintains the speed of the work at all times at least the constant speed of advance employed while the work is being operated upon and increases the speed of advance of the work between operations.

I provide a variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher. Brake means are preferably provided inhibiting turning by inertia of the driven shaft at a speed higher than the speed at which it is being driven at any instant.

As is made clear above, my variable speed transmission includes a first driving connection which is a constant speed driving connection and a second driving connection which is a variable speed driving connection. The second driving connection preferably includes means for varying at will the highest speed at which it drives the driven shaft.

The variable speed driving connection may include an eccentrically operating driving member, and means may be provided for varying at will the degree of eccentricity of operation of said driving member whereby to control the speed at which the driven shaft is driven.

In a present preferred form of variable speed transmission the variable speed driving connection includes an eccentrically mounted gear, a second gear and a floatingly mounted gear meshing with the eccentrically mounted gear and with the second gear. Means are provided for varying at will the degree of eccentricity of the mounting of the eccentrically mounted gear. Such means may include an operating member disposed at a fixed location and operable without stopping operation of the transmission.

The variable speed driving connection may include a mounting member connected with a shaft of the transmission, a mounted member mounted on the mounting member and adapted to be disposed at will thereon at different distances from the axis of said shaft, a gear carried by the mounted member, a second gear and a floatingly mounted gear meshing with the first mentioned gear and with the second gear. The floatingly mounted gear may be carried by links pivoted respectively about the axes of the first mentioned gear and the second gear.

The variable speed driving connection may include a mounting structure carried by a shaft of the transmission and inclined to the axis of the shaft, a gear carried by the mounting structure, a second gear, a third gear meshing with the first mentioned gear and with the second gear and means for relatively shifting the first mentioned gear and the mounting structure to shift the center of the first mentioned gear transversely of the axis of the shaft. The mounting structure may be made shiftable along the shaft and means may be provided for restraining the first mentioned gear from movement along the shaft. Means may be provided for shifting the mounting structure along the shaft to shift the center of the first mentioned gear transversely of the axis of the shaft while the first mentioned gear remains in the same general plane.

Other details, objects and advantages of the invention will become apparent as the following description of certain present preferred embodiments thereof proceeds.

In the accompanying drawings I have shown certain present preferred embodiments of the invention in which Figure 1 is a transverse cross-sectional view of a variable speed transmission;

Figure 2 is a fragmentary cross-sectional view taken at right angles to Figure 1 illustrating a portion of the structure;

Figure 3 is a detail cross-sectional view of a portion of the structure shown in Figure 1;

Figure 4 is a fragmentary cross-sectional view taken on the line IV—IV of Figure 3;

Figure 5 is a fragmentary detail cross-sectional view showing modified means for adjusting the eccentricity of a gear of the transmission;

Figure 6 is a graph illustrating the characteristics of my variable speed transmission; and Figure 7 is a detail cross-sectional view taken on the line VII—VII of Figure 1.

Referring now more particularly to the drawings, there is shown a housing 2 in which are journaled for rotation a driving shaft 3 and a driven shaft 4. The driving shaft 3 is adapted to be driven at constant speed by any suitable source of power (not shown). The driven shaft 4 is, as will be explained, driven during a portion of the cycle at constant speed and during another portion of the cycle at a speed higher than said constant speed. The driven shaft 4 may be connected with work feeding means such, for example, as pinch rolls to drive the same so that the work will be advanced at constant speed during the portion of the cycle when it is being operated on and at higher speed in between operations. A drag brake is indicated diagrammatically at 5 to inhibit turning by inertia of the driven shaft 4 at a speed higher than the speed at which it is being driven at any instant.

The transmission comprises two driving connections between the driving shaft 3 and the driven shaft 4. The two driving connections are designated generally in Figure 1 by A and B. The driving connection A is a constant speed driving connection and the driving connection B is a variable speed driving connection. Each of the driving connections A and B includes an overrunning clutch 6 so that at any instant the driving connection which tends to drive the driven shaft 4 at the higher speed is effective for driving the driven shaft. The other driving connection will at that instant have no effect on the driven shaft. Thus when the variable speed driving connection B is tending to drive the driven shaft 4 at a speed higher than the constant speed at which the driving connection A tends to drive the driven shaft 4 the driven shaft will be driven by the driving connection B, but when the driving connection B is tending to drive the driven shaft 4 at a speed lower than the constant speed at which the driving connection A tends to drive the driven shaft 4 the driven shaft will be driven by the driving connection A.

The driving connection A comprises a driving gear 7 fixed to the driving shaft 3 meshing with an intermediate gear 8 carried by a stub shaft 9 and which in turn meshes with a driven gear 10 which drives the driven shaft 4 through the corresponding overrunning clutch 6.

The driving connection B comprises a mounting member 11 fixed to the inner end of the driving shaft 3. The driving shaft 3 is journaled in bearings 12, the mounting member 11 being disposed adjacent the right-hand bearing 12, which is a pedestal mounted bearing, as shown in Figure 1. The mounting member 11 is somewhat elongated transversely of the axis of the driving shaft 3 and is of generally channel cross-section as shown in Figure 4 with inturned feet 13 forming therein a guideway. One end of the mounting member 11 (the lower end viewing Figure 3) is open and the opposite end (the upper end viewing Figure 3) is closed but provided with a bore 14 in alignment with the guideway. Disposed in the guideway in the mounting member 11 is a mounted member 15 shaped to fit the guideway in the mounting member 11 which is adapted to be shifted at will to different positions along the guideway and hence to operative positions at different distances from the axis of the driving shaft 3. The mounted member 15 has therethrough a threaded bore 16 and a screw 17 is threaded therethrough. The screw 17 adjacent its upper end viewing Figure 3 passes freely through the bore 14, and the screw 17 is maintained against axial movement relatively to the mounting member 11 by collars 18 pinned to the screw by pins 19 and disposed respectively at opposite sides of the end portion of the mounting member 11 containing the bore 14 as shown in Figure 3. The upper end of the screw 17 is squared as shown at 20 to facilitate turning of the screw by application of a wrench or other suitable tool. Turning of the screw 20 moves the mounted member 15 along the guideway in the mounting member 11. The mounted member 15 is maintained in any desired adjusted position relatively to the mounting member 11 by a jam nut 21 threaded onto the end of the screw 17 and turned up tightly against the end of the mounted member 15.

The mounted member 15 carries a stub shaft 22 whose axis is parallel to the axis of the driving shaft 3 to which is fixed a circular gear 23. As will be seen from Figure 3 it would be possible to adjust the mounted member 15 relatively to the mounting member 11 so that the shafts 3 and 22 would be coaxial, in which case the driving connection B would be a constant speed driving connection. However, since the object of the transmission is to drive the driven shaft at variable speed the mounted member 15 will in normal operation be positioned in the mounting member 11 so that the axes of the shafts 3 and 22 are offset from each other as shown in Figure 3. The result is that the circular gear 23 will turn, not about its own axis, but about the axis of the shaft 3 which is eccentric to the axis of the gear.

In operative alignment with the gear 23 is a gear 24 adapted to drive the driven shaft 4 through the corresponding overrunning clutch 6. A link 25 is pivoted to the driven shaft 4. A link 26 is pivoted to the stub shaft 22. A pin 27 passes through the links 25 and 26 and thus pivots the links together, and an intermediate floating gear 28 is rotatably mounted on the pin 27. The gear 28 is at all times in mesh with the gears 23 and 24, being so maintained by the links 25 and 26 as illustrated in Figure 2. During rotation of the gear 23 about the axis of the driving shaft 3, which as above explained is eccentric to the axis of the gear 23, the axes of the shafts 4 and 22 will move generally toward and away from each other, such movement being accompanied by scissors-like relative movement between the links 25 and 26. The result is a tendency of the driving connection B to drive the driven shaft 4 at variable speed, the elements of the transmission being designed so that the driving connection B tends to drive the driven shaft 4 at a relatively low speed lower than the constant speed at which the driving connection A tends to drive the driven shaft 4 and at a relatively high speed higher than the constant speed at which the driving connection A tends to drive the driven shaft 4. But when the driving connection B tends to drive the driven shaft 4 at a lower speed than the constant speed at which the driving connection A tends to drive the driven shaft 4 the driving connection B has no effect on the driven shaft 4 and that shaft is driven at constant speed by the driving connection A.

The characteristics of my variable speed transmission are shown in the graph constituting Figure 6 in which horizontal distances indicate progress through a cycle of operation of the transmission and vertical distances indicate the speed at which the driven shaft 4 is driven. During the portion of the cycle when the driving connection B tends to drive the driven shaft 4 at a speed greater than the speed at which the driving connection A tends to drive that shaft the speed of movement of the driven shaft 4 is indicated by the upwardly convex curve B. When the driving connection B tends to drive the driven shaft 4 at a speed lower than the constant speed at which the driving connection A tends to drive the driven shaft 4 the speed of the driven shaft is constant and designated by the straight line portion A of the curve. Thus during each cycle the minimum speed of the driven shaft 4 is the constant speed employed when the work is being operated on and the shaft is speeded up between operations to increase the efficiency of the mechanism.

Figure 5 shows a modified mounting of a gear designated therein as 23a which corresponds, except for constructional details of the gear, to the gear 23 of Figures 1 and 2. Parts shown in Figure 5 which correspond to parts shown in Figures 1 and 2 are desginated by the same reference numerals but each with a prime affixed.

In Figure 5 the driving shaft 3', which corresponds to the driving shaft 3 of Figures 1 and 2, is extended toward the right through the housing 2'. Splined to the shaft 3' to the right of pedestal mounted bearing 12' viewing Figure 5 is a mounting structure 29 which as shown is inclined to the axis of the shaft 3', i. e., the outer surface 30 of the mounting structure 29 is of generally cylindrical cross section but inclined to the axis of the shaft 3'. Since the mounting structure 29 is splined to the shaft 3' it rotates therewith. The mounting structure 29 is adapted for movement parallel to the axis of the shaft 3'. At its right-hand end viewing Figure 5 it has a radial flange 31 about which extends a cage 32 containing bearings 33. The bearings 33 permit rotation of the flange 31 and consequently of the mounting structure 29 relatively to the cage 32 while at the same time movement of the cage 32 axially of the shaft 3' shifts the mounting structure 29 axially. The cage 32 forms the inner end of a sleeve 34 surrounding the shaft 3' where the shaft passes through the wall of the housing 2'. Mounted in the wall of the housing 2' is a bearing 35 having an internally threaded bore 36. The portion of the sleeve 34 within the bore 36 is threaded and the threads thereof mesh with those of the threaded bore 36 of the bearing 35. An operating hand wheel 37 is fastened to the outer end of the sleeve 34. Turning of the hand wheel 37 turns the sleeve 34 and consequently also the cage 32 which is integral therewith. But since the internally threaded bearing 35 is stationary with respect to the housing turning of the sleeve 34 causes movement of the cage 32 axially of the shaft 3'. Such movement of the cage 32 causes consonant axial movement of the mounting structure 29.

The gear 23a, which as above stated corresponds generally to the gear 23 of Figures 1 and 2, has an inclined bore 28 so that the gear 23a fits upon the mounting structure 29. The gear 23a is splined to the mounting structure 29 so as to rotate therewith but be slidable therealong. The gear 23a is disposed generally in a plane at right angles to the axis of the shaft 3'.

The gear 23a is restrained against movement in a direction parallel to the axis of the shaft 3'. Such restraint may be effected by stationary members 39 bearing against opposite faces of the central hub portion 40 of the gear as shown in Figure 5.

The gear 23a meshes with an intermediate gear corresponding to the gear 28 of Figures 1 and 2 which in turn meshes with a driven gear corresponding to the gear 24 of Figures 1 and 2. The intermediate gear may be mounted similarly to the gear 28 and when the structure of Figure 5 is employed the link corresponding to the link 26 of Figures 1 and 2 may be positioned to the left of the gear 23a and the mounting structure 29 viewing Figure 5 although the link is not shown in that figure.

The structure of Figure 5 has an advantage over that of Figures 1–4 in that the eccentricity of the mounting of the gear 23a may be changed without stopping the operation of the transmission by the simple expedient of turning the hand wheel 37. In order to change the eccentricity of the mounting of the gear 23 of Figures 1–4 it is necessary to stop the operation of the transmission to permit loosening of the jam nut 21 and turning of the screw 17, after which the jam nut 21 is again tightened. However, both forms function equally well in operation of the variable speed transmission.

It will be understood from Figure 5 that when hand wheel 37 is turned the movement of the mounting structure 29 in the bore 38 of the gear 23a changes the eccentricity of the mounting of the gear 23a while that gear is maintained in its plane by the members 39. In the structure of Figures 1–4 members corresponding to the members 39 of Figure 5 are unnecessary because the adjustment of the eccentricity of the gear 23 is obtained by moving the mounted member 15 in the mounting member 11 in a direction at right angles to the shaft 3.

While I have shown and described certain present preferred embodiments of the invention it is to be distinctly understood that the invention is not limited thereto but may be otherwise variously embodied within the scope of the following claims.

I claim:

1. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher.

2. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, and brake means inhibiting turning by inertia of the driven shaft at a speed higher than the speed at which it is being driven at any instant.

3. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed whereby the driven shaft is driven at a speed which is always at least as high as said constant speed and at times higher, the second mentioned driving connection including means for varying at will the highest speed at which it drives the driven shaft.

4. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including an eccentrically operating driving member.

5. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including an eccentrically operating driving member and means for varying at will the degree of eccentricity of operation of said driving member.

6. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including an eccentrically mounted gear, a second gear and a floatingly mounted gear meshing with the eccentrically mounted gear and with the second gear.

7. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including an eccentrically mounted gear, a second gear, a floatingly mounted gear meshing with the eccentrically mounted gear and with the second gear and means for varying at will the degree of eccentricity of the mounting of the eccentrically mounted gear.

8. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including an eccentrically mounted gear, a second gear, a floatingly mounted gear meshing with the eccentrically mounted gear and with the second gear and means including an operating member disposed at a fixed location and operable without stopping operation of the transmission for varying at will the degree of eccentricity of the mounting of the eccentrically mounted gear.

9. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed whereby the driven shaft is driven at a speed which is always at least as high as said constant speed and at times higher, the second mentioned driving connection including a mounting member connected with a shaft of the transmission, a mounted member mounted on the mounting member and adapted to be disposed at will thereon at different distances from the axis of said shaft, a gear carried by the mounted member, a second gear and a floatingly mounted gear meshing with the first mentioned gear and with the second gear.

10. A variable speed transmission comprising a driving shaft, a driven shaft and two driving connections, between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including an eccentrically operating circular gear, a second gear, a third gear meshing with the first mentioned gear and the second gear and links carrying the third gear and pivoted respectively about the axes of the first mentioned gear and the second gear.

11. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including a mounting structure carried by a shaft of the transmission and inclined to the axis of the shaft, a gear carried by the mounting structure, a second gear, a third gear meshing with the first mentioned gear and with the second gear and means for relatively shifting the first mentioned gear and the mounting structure to shift the center of the first mentioned gear transversely of the axis of the shaft.

12. A variable speed transmission comprising a driving shaft, a driven shaft and two driving connections between the shafts, each of such driving connections including an overrunning clutch so that at any instant the driving connection which tends to drive the driven shaft at higher speed is effective for driving the driven shaft, one of such driving connections tending to drive the driven shaft at constant speed, the other of such driving connections tending to drive the driven shaft at variable speed at times higher and at times lower than said constant speed, whereby the driven shaft is driven at a speed which is always at least as high as said constant speed and at times higher, the second mentioned driving connection including a mounting structure carried by a shaft of the transmission, inclined to the axis of the shaft and shiftable along the shaft, a gear carried by the mounting structure, means restraining the gear against movement along the shaft, a second gear, a third gear meshing with the first mentioned gear and with the second gear and means for shifting the mounting structure along the shaft to shift the center of the first mentioned gear transversely of the axis of the shaft.

No references cited.